(12) United States Patent
Xiu (10) Patent No.: US 10,498,731 B2
(45) Date of Patent: Dec. 3, 2019

(54) APPARATUS AND METHOD FOR CONTROLLING WIRELESS NETWORK ACCESS AND WIRELESS DATA TRAFFIC

(71) Applicant: ALIBABA GROUP HOLDING LIMITED, George Town, Grand Cayman (KY)

(72) Inventor: Chao Xiu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 14/746,548

(22) Filed: Jun. 22, 2015

(65) Prior Publication Data

US 2016/0007265 A1    Jan. 7, 2016

(30) Foreign Application Priority Data

Jul. 4, 2014    (CN) .......................... 2014 1 0318741

(51) Int. Cl.
*H04L 29/06* (2006.01)
*H04W 40/02* (2009.01)
(Continued)

(52) U.S. Cl.
CPC ..... *H04L 63/0876* (2013.01); *H04W 28/0215* (2013.01); *H04W 40/02* (2013.01);
(Continued)

(58) Field of Classification Search
CPC ............... H04L 12/56; H04L 29/06095; H04L 29/0653; H04L 45/74; H04L 49/3009;
(Continued)

(56) References Cited

U.S. PATENT DOCUMENTS 7,466,986 B2    12/2008    Halcrow et al.
7,535,880 B1    5/2009    Hinman et al.
(Continued)

FOREIGN PATENT DOCUMENTS

CA    2736346    10/2012
CN    1835512 A    9/2006
(Continued)

OTHER PUBLICATIONS

PCT International Search Report and Written Opinion dated Sep. 11, 2015, issued in corresponding International Application No. PCT/US2015/037004 (13 pages).

(Continued)

*Primary Examiner* — Ashley Shivers
(74) *Attorney, Agent, or Firm* — Finnegan, Henderson, Farabow, Garrett & Dunner, LLP (57) ABSTRACT

Apparatus and method are disclosed for controlling wireless network access and wireless data traffic. The method may include obtaining a recognition identifier of a Wireless Fidelity (Wi-Fi) hotspot device. The method may also include determining a type of the Wi-Fi hotspot device according to the recognition identifier. In addition, the method may include controlling information downloading or wireless data traffic of an information processing device according to the type of the Wi-Fi hotspot device.

24 Claims, 6 Drawing Sheets

(51) Int. Cl.
*H04W 40/04* (2009.01)
*H04W 48/20* (2009.01)
*H04W 28/02* (2009.01)
H04W 74/00 (2009.01)
H04W 12/08 (2009.01)
H04W 84/12 (2009.01)
H04W 88/04 (2009.01)
H04W 12/00 (2009.01)

(52) U.S. Cl.
CPC ........... *H04W 40/04* (2013.01); *H04W 48/20* (2013.01); *H04W 12/00516* (2019.01); *H04W 12/08* (2013.01); *H04W 74/00* (2013.01); *H04W 84/12* (2013.01); *H04W 88/04* (2013.01)

(58) Field of Classification Search
CPC .. H04L 49/309; H04L 63/0876; H04W 40/02; H04W 40/04; H04W 28/0215
See application file for complete search history.

(56) References Cited

U.S. PATENT DOCUMENTS

| | | | |
|---|---|---|---|
| 8,126,476 | B2 | 2/2012 | Vardi et al. |
| 8,402,120 | B1 | 3/2013 | Perkinson |
| 8,495,236 | B1* | 7/2013 | Glasser ............. H04L 29/08522 709/203 |
| 8,570,993 | B2 | 10/2013 | Austin et al. |
| 8,644,828 | B2 | 2/2014 | Scherzer |
| 2005/0135375 | A1 | 6/2005 | Hurtta et al. |
| 2006/0153122 | A1 | 7/2006 | Hinman et al. |
| 2009/0080390 | A1 | 3/2009 | Zhou et al. |
| 2009/0109941 | A1 | 4/2009 | Carter |
| 2010/0246486 | A1 | 9/2010 | Lin et al. |
| 2012/0129460 | A1* | 5/2012 | Hodis ..................... G01S 19/48 455/67.11 |
| 2013/0171964 | A1 | 7/2013 | Bhatia et al. |
| 2013/0297730 | A1 | 11/2013 | Zhang et al. |
| 2014/0057593 | A1 | 2/2014 | Cloutier |
| 2014/0064260 | A1 | 3/2014 | Mastenbrook et al. |
| 2014/0106748 | A1 | 4/2014 | Scherzer |
| 2014/0171078 | A1* | 6/2014 | Ryerson ................ H04W 48/18 455/435.2 |
| 2014/0177513 | A1 | 6/2014 | Balasubramanian et al. |
| 2014/0307550 | A1 | 10/2014 | Forssell et al. |
| 2015/0063331 | A1 | 3/2015 | Scahill et al. |
| 2015/0078359 | A1 | 3/2015 | Scahill et al. |

FOREIGN PATENT DOCUMENTS

| | | | |
|---|---|---|---|
| CN | 101072126 | A | 11/2007 |
| CN | 103501333 | A * | 1/2014 |
| CN | 103501333 | A | 1/2014 |
| CN | 103533608 | A | 1/2014 |
| CN | 103619018 | A | 3/2014 |
| JP | 2008160324 | A | 7/2008 |
| KR | 10-2013-0049876 | A | 5/2013 |
| WO | WO 2009/121163 | A1 | 10/2009 |
| WO | WO-2014/108755 | A1 | 7/2014 |
| WO | WO 2016/003690 | A1 | 1/2016 |

OTHER PUBLICATIONS

Written Opinion issued from the Singapore Patent Office in related Application No. 11201610278U; dated Oct. 2, 2017 (6 pgs.).
Extended European Search Report in European Application No. 15815737.0-1854/3165009 (PCT/US2015037004), pursuant to Rule 62 EPC, the Supplementary European Search Report (Art 153(7) EPC) and the European Search Opinion, dated Jun. 16, 2017.
First Chinese Search Report issued in Chinese Application No. CN201410318741.4, dated Mar. 16, 2018, 2 pages.
First Chinese Office Action issued in Chinese Application No. CN201410318741.4, dated Apr. 2, 2018, 9 Pages.
Japanese Office Action issued in Japanese Application No. 2016-573834, dated Mar. 13, 2019 (7 pages).
Korean Office Action issued in Korean Application No. 10-2017-7002045, dated Mar. 5, 2019 (8 pages).
Second Chinese Office Action issued in Chinese Application No. 201410318741.4, dated Dec. 24, 2018, 20 pages.
Second Written Opinion issued from the Singapore Patent Office in related Application No. 11201610278U; dated Aug. 17, 2018 (6 pgs.).
"How to determine (if possible) the device type by MAC address" retrieved from the Internet: https://www.experts-exchange.com/questions/23644286/How-to-determine-if-possible-the-device-type-by-MAC-address.html, 8 pages (2008).

\* cited by examiner

```
┌─────────────────────────────────────────┐
│ OBTAIN A RECOGNITION IDENTIFIER OF A WI-FI│
│ HOTSPOT DEVICE THROUGH WHICH A CLIENT   │
│ APPLICATION ACCESSES A WIRELESS NETWORK │
│                                     201 │
└─────────────────────────────────────────┘
                    │
                    ▼
┌─────────────────────────────────────────┐
│ DETERMINE A TYPE OF THE WI-FI HOTSPOT   │
│ DEVICE ACCORDING TO THE RECOGNITION     │
│ IDENTIFIER                              │
│                                     202 │
└─────────────────────────────────────────┘
                    │
                    ▼
┌─────────────────────────────────────────┐
│ CONTROL INFORMATION DOWNLOADING OF THE  │
│ CLIENT APPLICATION ACCORDING TO THE TYPE│
│ OF THE WI-FI HOTSPOT DEVICE             │
│                                     203 │
└─────────────────────────────────────────┘
```

APPARATUS AND METHOD FOR CONTROLLING WIRELESS NETWORK ACCESS AND WIRELESS DATA TRAFFIC

CROSS REFERENCE TO RELATED APPLICATION

The present application claims the benefits of priority to Chinese Patent Application No. 201410318741.4, filed Jul. 4, 2014, the entire contents of which are incorporated herein by reference.

TECHNICAL FIELD

The present application relates to the field of communication technologies, and more particularly, to apparatus and method for controlling wireless network access and wireless data traffic.

BACKGROUND

Along with the development of wireless communication technologies, an intelligent terminal device (e.g., smart phones, tablets, laptops, etc.) can access the Internet wirelessly through a wireless network shared by a Wireless Fidelity (Wi-Fi) hotspot device. There are generally two types of Wi-Fi hotspot devices: the first type includes wireless routing devices, for example, a wireless router used to convert a wired network into a wireless network; the second type includes intelligent terminal devices having a Wi-Fi hotspot function, which enables the intelligent terminal device to share a telecommunication network (e.g., 2G/3G/4G network) used by the intelligent terminal device with another intelligent terminal device, such as a smart phone, a notebook computer, etc.

Downloading a large amount of data using a wireless network shared by an intelligent terminal device may cause excessive cost associated with the data traffic. Therefore, it is desirable to provide a solution to automatically control the wireless data traffic to prevent excessive cost under similar situations.

SUMMARY

In one aspect, the present disclosure is directed to a method for controlling wireless data traffic of an information processing device. The method may include obtaining a recognition identifier of a Wi-Fi hotspot device. The method may also include determining a type of the Wi-Fi hotspot device according to the recognition identifier. The method may further include controlling the wireless data traffic of the information processing device according to the type of the Wi-Fi hotspot device.

In another aspect, the present disclosure is directed to an apparatus for controlling wireless data traffic. The apparatus may include a memory device and a processor device communicatively coupled to the memory device. The processor device may be configured to obtain a recognition identifier of a Wi-Fi hotspot device. The processor device may also be configured to determine a type of the Wi-Fi hotspot device according to the recognition identifier. The processor device may further be configured to control the wireless data traffic of an information processing device according to the type of the Wi-Fi hotspot device.

In a further aspect, the present disclosure is directed to a method for controlling wireless network access. The method may include obtaining a recognition identifier of a Wi-Fi hotspot device through which a client application accesses a wireless network. The method may also include determining a type of the Wi-Fi hotspot device according to the recognition identifier. The method may further include controlling information downloading of the client application according to the type of the Wi-Fi hotspot device.

In a further aspect, the present disclosure is directed to a computer server for providing wireless traffic control service to a client application. The computer server may include a memory device and a processor device communicatively coupled to the memory device. The processor device may be configured to obtain a recognition identifier of a Wi-Fi hotspot device through which the client application accesses a wireless network. The processor device may also be configured to determine a type of the Wi-Fi hotspot device according to the recognition identifier. The processor device may further be configured to control information downloading of the client application according to the type of the Wi-Fi hotspot device.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

Figure 1:
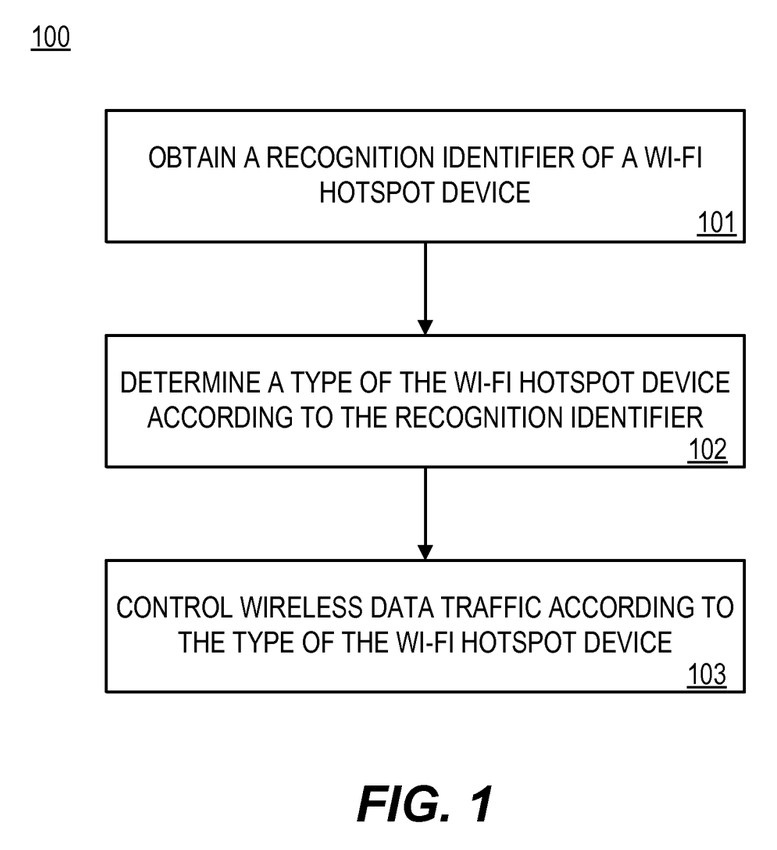
FIG. 1 is a flow chart of an exemplary method for controlling wireless data traffic, according to an embodiment of the present application.

FIG. 1 is a flow chart of an exemplary method 100 for controlling wireless data traffic, according to an embodiment of the present application. Method 100 may comprise the following steps:

Step 101: An intelligent terminal device may obtain a recognition identifier of a Wi-Fi hotspot device.

This embodiment can be applied to an intelligent terminal device, such as a smart phone, a tablet computer, or other electronic devices equipped with a Wi-Fi connection function that enables the intelligent terminal device to access the network resources such as the Internet through a Wi-Fi hotspot device. As used herein, an intelligent terminal device may also be referred to as an information processing device. An intelligent terminal device may obtain a recognition identifier of a Wi-Fi hotspot device using, for example, a certain Application (APP) installed on the intelligent terminal device.

The recognition identifier may comprise a Media Access Control (MAC) address, a Service Set Identifier (SSID), and/or other identifiers capable of recognizing a type of the Wi-Fi hotspot device.

Step 102: The intelligent terminal device may determine a type of the Wi-Fi hotspot device according to the recognition identifier.

In this embodiment, a correspondence between the recognition identifier and a type of the Wi-Fi hotspot device may be stored in advance. The types of the Wi-Fi hotspot device may comprise an intelligent terminal device, a wireless routing device, etc. An intelligent terminal device may function as a Wi-Fi hotspot device. For example, an intelligent terminal device may share its telecommunication network connection, such as a 2G/3G/4G network, to another intelligent terminal device, thereby functioning as a Wi-Fi hotspot. A wireless routing device can convert a wired network into a wireless network, thereby functioning as a Wi-Fi hotspot for various devices to access network resources such as the Internet.

Step 103: The intelligent terminal device may control its wireless data traffic according to the type of the Wi-Fi hotspot device.

In this embodiment, a correspondence between a type of the Wi-Fi hotspot device and a wireless data traffic control strategy may be stored in advance. For example, when the type of the Wi-Fi hotspot device is a wireless routing device, wireless data traffic of the intelligent terminal device may not be limited. In another example, when the type of the Wi-Fi hotspot device is an intelligent terminal device, wireless data traffic of the intelligent terminal device may be limited to prevent excessive data cost. For example, the intelligent terminal device may be forbidden from downloading an excessively large file, so as to avoid causing excessive data traffic cost to the intelligent terminal device that functions as the Wi-Fi hotspot.

In method 100, a recognition identifier of a Wi-Fi hotspot device may be obtained, a type of the Wi-Fi hotspot device may be determined, and different actions may be performed to control the wireless data traffic of an intelligent terminal device according to different types of the Wi-Fi hotspot devices. For a user providing a Wi-Fi hotspot by sharing his/her telecommunication (e.g., 2G/3G/4G) network connection, the wireless data traffics of one or more other devices using the Wi-Fi hotspot to connect to the Internet may be limited, for example, from downloading an excessively large file, so as to save the user data cost associated with the wireless data traffic.

An embodiment is described as follows using an example in which a smart phone accesses network resources through a Wi-Fi hotspot.

After enabling the Wi-Fi function, the smart phone may scan to obtain all available Wi-Fi hotspots whose signals covering the smart phone, and obtain information of each Wi-Fi hotspot, such as an SSID and/or a Basic Service Set Identification (BSSID). The SSID may be a user editable name of the corresponding Wi-Fi hotspot. The BSSID may be an actual MAC address of the corresponding Wi-Fi hotspot device, or may be a MAC address derived from the actual MAC address of the corresponding Wi-Fi hotspot device. In either case, the first three bytes of the MAC address are generally a device code distributed to the manufacturer of the Wi-Fi hotspot device (or the manufacturer of the Wi-Fi module integrated in the Wi-Fi hotspot device) by a Registration Authority (RA), after the device manufacturer registers to the RA of the Institute of Electrical and Electronics Engineers (IEEE). The device code of a particular manufacturer is different from device codes of other device manufacturers.

The accuracy for determining the type of the Wi-Fi hotspot device using the MAC address is relatively high. In a preferable implementation, a MAC address of a Wi-Fi hotspot device is obtained, and the type of the Wi-Fi hotspot device can be determined according to the MAC address. For example, an Organizationally Unique Identifier (OUI) distribution library may be accessed through the network. The OUI distribution library may be looked up for information of a device manufacturer corresponding to the first three bytes of the MAC address, and the type of the Wi-Fi hotspot device can be determined according to the information of the device manufacturer. A correspondence between the device manufacturer and the type of the Wi-Fi hotspot device may be stored in advance. For example, the type of a Wi-Fi hotspot device corresponding to a device manufacturer TP-LINK may be a wireless routing device, and the type of a Wi-Fi hotspot device corresponding to a device manufacturer APPLE may be an intelligent terminal device.

When the information of the device manufacturer includes multiple types of Wi-Fi hotspot devices, the type of the Wi-Fi hotspot device may be determined according to relationships between MAC addresses provided by the device manufacturer and the multiple types of the Wi-Fi hotspot devices. For example, if a device manufacturer manufactures both intelligent terminal devices and wireless routing devices, the type of the Wi-Fi hotspot device may be determined according to a correspondence between the MAC address provided by the device manufacturer and the type of the Wi-Fi hotspot device.

Some device manufacturers may not register to a RA of the IEEE, and therefore, these device manufacturers cannot be found in the OUI distribution library. In this case, the type of the Wi-Fi hotspot device may be determined according to an SSID of the Wi-Fi hotspot. For example, an SSID of a Wi-Fi hotspot device may be modified by the user or may remain as a default value preset by the Wi-Fi hotspot device manufacturer or by the operating system of the device. The default SSID is generally a device name or a system name plus a string of characters. Therefore, the type of the Wi-Fi hotspot device may be determined by determining whether a preset character string exists in the SSID. For example, a device using an Android operating system is generally an intelligent terminal device, and the default SSID preset by the Android operating system generally comprises a character string Android. Therefore, a correspondence between the character string Android in the SSID and the type of the Wi-Fi hotspot device (e.g., intelligent terminal device) may be preset. In another example, manufacturer TP-LINK generally makes wireless routing devices, and a default SSID thereof generally comprises a character string TP-LINK. Thus, a correspondence between the character string TP- LINK in the SSID and the type of the Wi-Fi hotspot device (e.g., wireless routing device) may be preset.

Once the type of the Wi-Fi hotspot device is determined, the wireless data traffic may be controlled according to the type of the Wi-Fi hotspot device. For example, when the type of the Wi-Fi hotspot device is an intelligent terminal device, downloading a file having a size exceeding a preset value may be forbidden. The preset value may be set by a developer or a user. For example, the preset value may be set as 10 M bytes. For instance, if a Wi-Fi hotspot device providing wireless network access to a smart phone is another intelligent terminal device, the smart phone may be forbidden from downloading a file exceeding 10 MB. Such file may be, for example, a certain APP or media file. Limiting the downloading file size may avoid causing excessive data traffic cost to the intelligent terminal device functioning as the Wi-Fi hotspot. A person skilled in the art may appreciate that other strategies of controlling the wireless data traffic are also possible, such as forbidding a device from downloading any file or other suitable methods.

In the example disclosed above, a recognition identifier of a Wi-Fi hotspot device is acquired, a type of the Wi-Fi hotspot device can then be determined, and different actions can be performed to control wireless data traffic of an intelligent terminal device according to different types of Wi-Fi hotspot devices. For a user providing a Wi-Fi hotspot by sharing his/her telecommunication (e.g., 2G/3G/4G) network connection, the wireless data traffics of one or more other devices using the Wi-Fi hotspot to connect to the Internet may be limited, for example, from downloading an excessively large file, so as to save the user data cost associated with the wireless data traffic.

Figure 2:
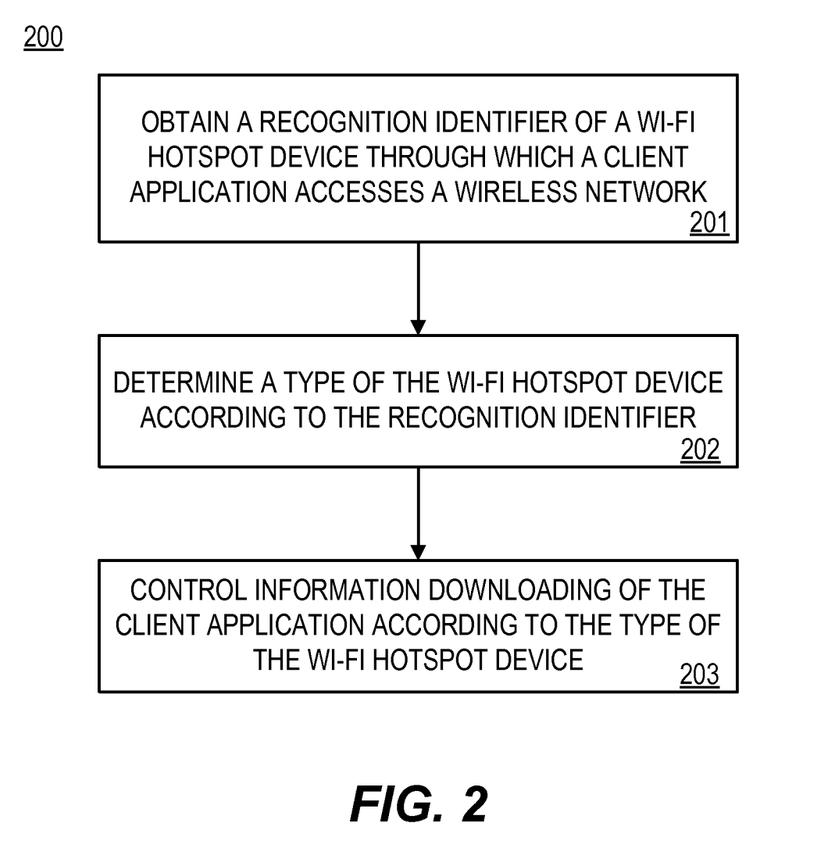
FIG. 2 is a flow chart of an exemplary method for controlling wireless network access, according to another embodiment of the present application.

FIG. 2 is a flow chart of an exemplary method 200 for controlling wireless network access, according to another embodiment of the present application. Method 200 may comprise the following steps:

Step 201: Obtain a recognition identifier of a Wi-Fi hotspot device through which a client application accesses to a wireless network.

Step 202: Determine a type of the Wi-Fi hotspot device according to the recognition identifier.

Step 203: Control information downloading of the client application according to the type of the Wi-Fi hotspot device.

Method 200 may be applied to a computer server. When the client application accesses the computer server through a network, the client application can download a file from the computer server.

For example, an intelligent terminal device having the client application loaded may access a wireless network through a Wi-Fi hotspot and obtain a recognition identifier of the Wi-Fi hotspot device. The manner of obtaining the recognition identifier of the Wi-Fi hotspot device may be similar to that of method 100. The client application, when communicating with the computer server, may send to the server the recognition identifier of the Wi-Fi hotspot device. The client application may send the recognition identifier of the Wi-Fi hotspot device after connecting to the server, or may send the recognition identifier of the Wi-Fi hotspot device to the server after receiving a request from the server. Other timings and manners of sending the recognition identifier may also be used.

After obtaining the recognition identifier of the Wi-Fi hotspot device sent by the client application, the computer server may determine the type of the Wi-Fi hotspot device according to the recognition identifier, and then control information downloading of the client application according to the type. Determination of the type and control of the information downloading may be implemented similarly to those of method 100.

Figure 3:
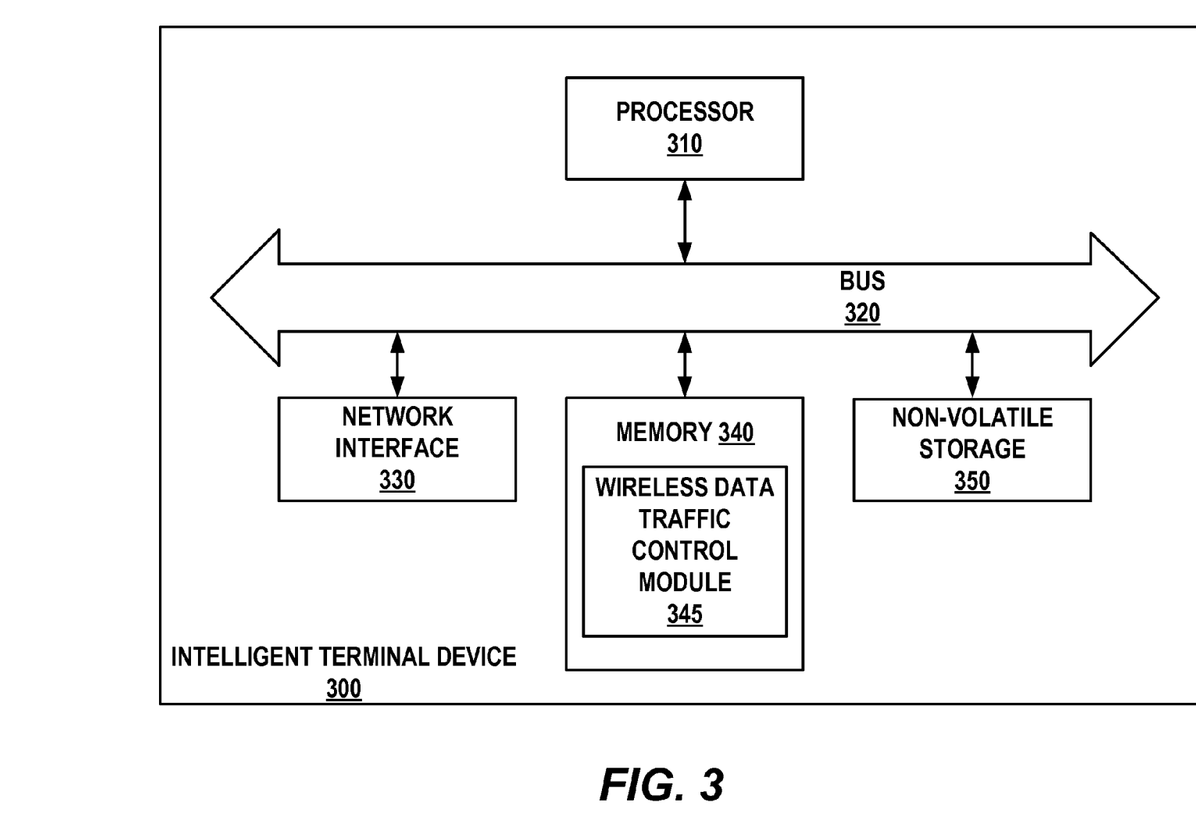
FIG. 3 is a schematic diagram of an exemplary intelligent terminal device, according to an embodiment of the present application.
Figure 4:
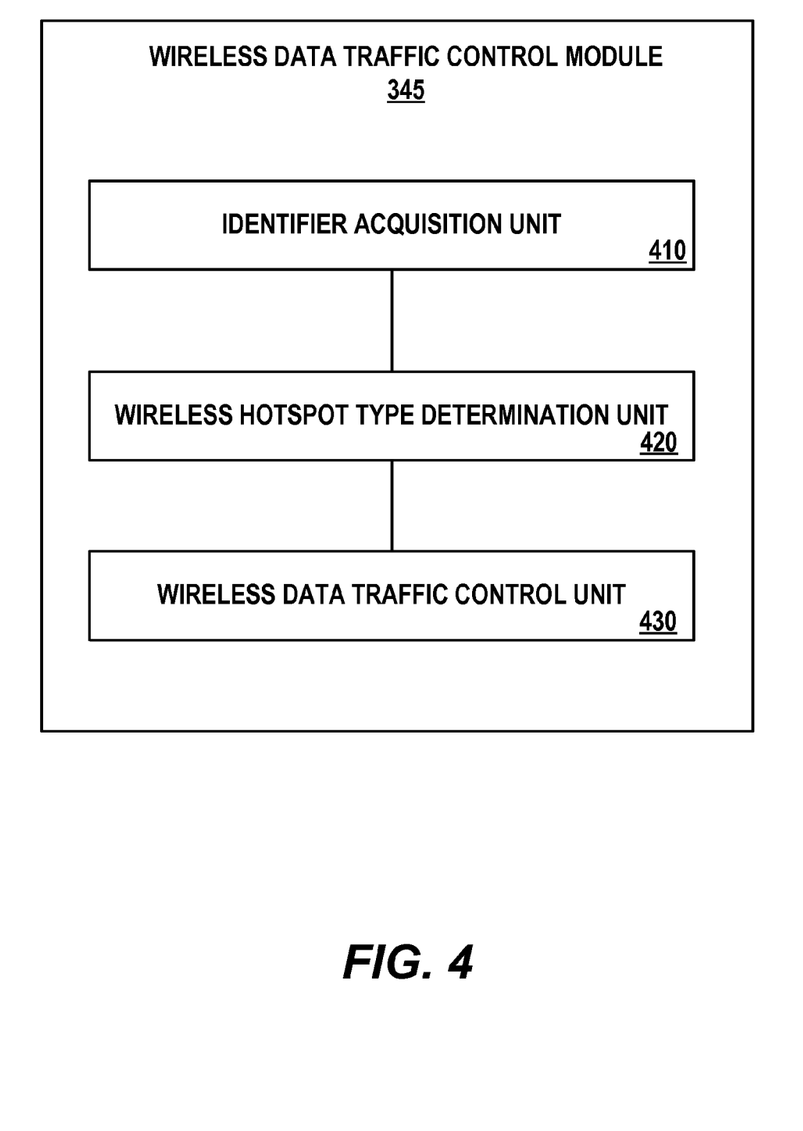
FIG. 4 is a functional diagram of an exemplary wireless data traffic control module, according to an embodiment of the present application.

The present disclosure further provides an embodiment of a wireless data traffic control apparatus corresponding to method 100. For example, the control functions may be implemented using software, and may be executed on an intelligent terminal device, which functions as a carrier of the wireless data traffic control apparatus. FIG. 3 is a schematic diagram of an exemplary intelligent terminal device 300 configured to control wireless data traffic. Intelligent terminal device 300 may include a processor device 310, a bus 320, a network interface 330, a memory device 340, and a non-volatile storage 350. A wireless data traffic control module 345 may be loaded in memory 340, which, when executed by processor 310, perform various control functions. FIG. 4 is a functional diagram of wireless data traffic control module 345. As shown in FIG. 4, wireless data traffic control module 345 may include an identifier acquisition unit 410, a wireless hotspot type determination unit 420, and a wireless data traffic control unit 430.

Identifier acquisition unit 410 may be configured to obtain a recognition identifier of a Wi-Fi hotspot device, for example, through network interface 330.

Wireless hotspot type determination unit 420 may be configured to determine a type of the Wi-Fi hotspot device according to the recognition identifier.

Wireless data traffic control unit 430 may be configured to control the wireless data traffic of intelligent terminal device 300 according to the type of the Wi-Fi hotspot device.

Figure 5:
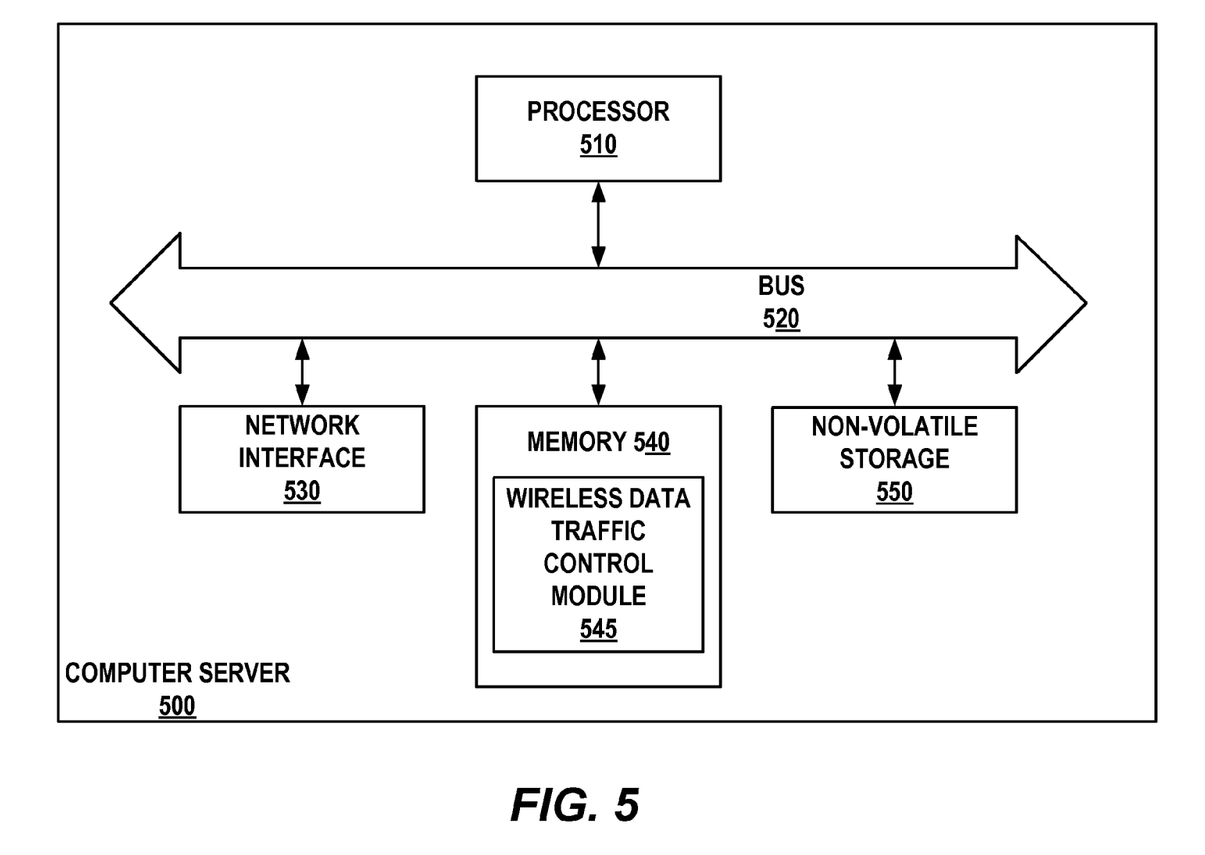
FIG. 5 is a schematic diagram of an exemplary computer server, according to another embodiment of the present application.
Figure 6:
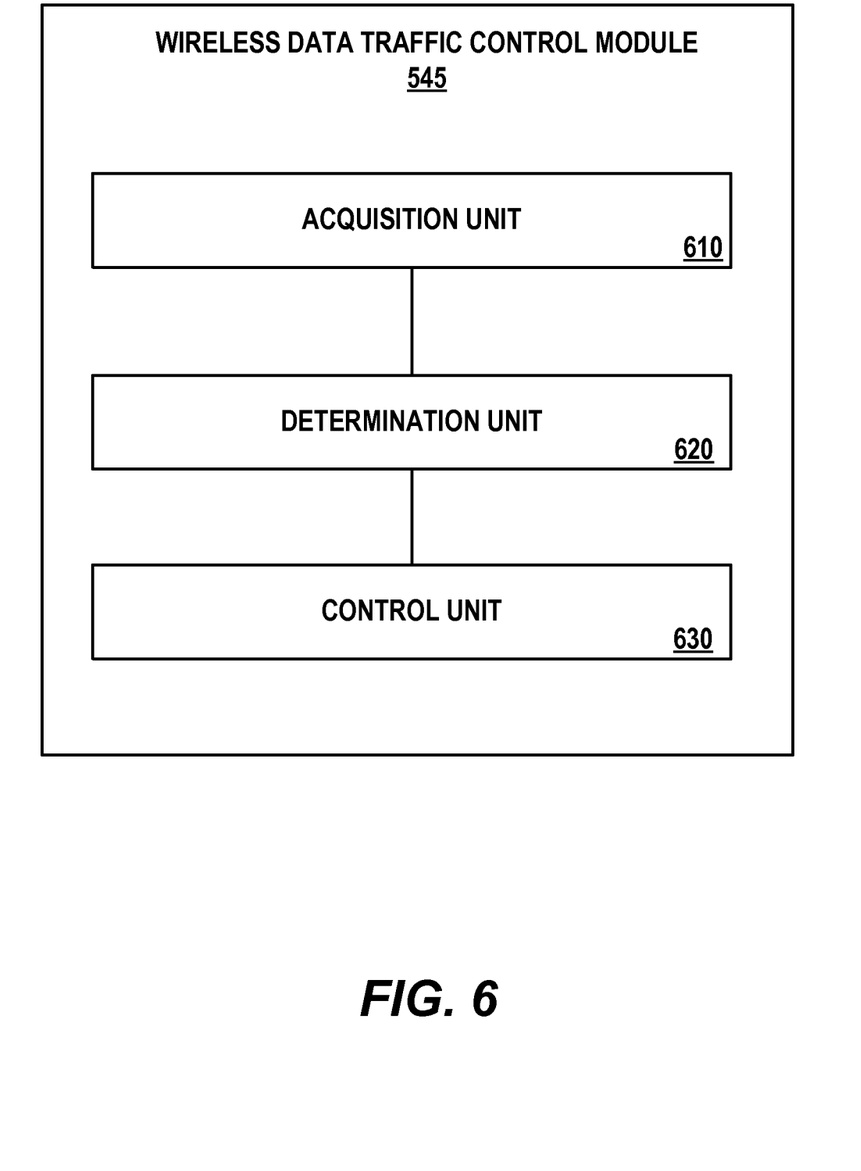
FIG. 6 is a functional diagram of an exemplary wireless data traffic control module, according to another embodiment of the present application.

The present disclosure further provides an embodiment of a computer server 500 for providing wireless traffic control service to a client application corresponding to method 200. For example, the control functions may be implemented using software, and may be executed by computer server 500. FIG. 5 is a schematic diagram of an exemplary computer server 500 configured to provide wireless traffic control service. Server 500 may include a processor device 510, a bus 520, a network interface 530, a memory device 540, and a non-volatile storage 550. A wireless data traffic control module 545 may be loaded in memory 540, which, when executed by processor 510, perform various control functions. FIG. 6 is a functional diagram of wireless data traffic control module 545. As shown in FIG. 6, wireless data traffic control module 545 may include an acquisition unit 610, a determination unit 620, and a control unit 630.

Acquisition unit 610 may be configured to obtain a recognition identifier of a Wi-Fi hotspot device through which a client application accesses a wireless network.

Determination unit 620 may be configured to determine a type of the Wi-Fi hotspot device according to the recognition identifier.

Control unit 630 may be configured to control information downloading of the client application according to the type of the Wi-Fi hotspot device.

Implementation of functions and actions of various units in the above apparatus and server may be obtained with reference to the implementation of corresponding methods and steps.

The specification has described apparatuses and methods for controlling wireless data traffic. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, implemented by a processor device, for controlling wireless data traffic of an information processing device, the method comprising:
   obtaining a recognition identifier of a Wi-Fi hotspot device;
   determining, by the processor device, whether the Wi-Fi hotspot device is a wireless routing type of device or an intelligent terminal type of device based on the recognition identifier; and
   controlling the wireless data traffic of the information processing device according to the determined type of device, including:
      forbidding the information processing device from downloading a file having a size exceeding a preset value when it is determined that the Wi-Fi hotspot device is the intelligent terminal type of device, and
      providing the wireless data traffic of the information processing device when it is determined that the Wi-Fi hotspot device is the wireless routing type of device.

2. The method of claim 1, wherein the recognition identifier comprises a Media Access Control (MAC) address of the Wi-Fi hotspot device, and determining whether the Wi-Fi hotspot device is the wireless routing type of device or the intelligent terminal type of device based on the recognition identifier comprises:
   looking up information of a device manufacturer corresponding to the MAC address in an Organizationally Unique Identifier (OUI) distribution library; and
   determining whether the Wi-Fi hotspot device is the wireless routing type of device or the intelligent terminal type of device based on the information of the device manufacturer.

3. The method of claim 2, wherein determining whether the Wi-Fi hotspot device is the wireless routing type of device or the intelligent terminal type of device based on the information of the device manufacturer comprises:
   when the information of the device manufacturer includes multiple types of Wi-Fi hotspot devices, determining whether the Wi-Fi hotspot device is the wireless routing type of device or the intelligent terminal type of device based on relationships between MAC addresses provided by the device manufacturer and the multiple types of the Wi-Fi hotspot devices.

4. The method of claim 2, further comprising:
   when the information of the device manufacturer corresponding to the MAC address is not found in the OUI distribution library, determining whether the Wi-Fi hotspot device is the wireless routing type of device or the intelligent terminal type of device based on a Service Set Identifier (SSID) of the Wi-Fi hotspot device.

5. An apparatus for controlling wireless data traffic, comprising:
   a memory device; and
   a processor device communicatively coupled to the memory device, wherein the processor device is configured to:
      obtain a recognition identifier of a Wi-Fi hotspot device;
      determine whether the Wi-Fi hotspot device is a wireless routing type of device or an intelligent terminal type of device based on the recognition identifier; and
      control the wireless data traffic of an information processing device according to the determined type of device, including:
         a forbidding of the information processing device from downloading a file having a size exceeding a preset value when it is determined that the Wi-Fi hotspot device is the intelligent terminal type of device, and
         a providing of the wireless data traffic of the information processing device when it is determined that the Wi-Fi hotspot device is the wireless routing type of device.

6. The apparatus of claim 5, wherein the recognition identifier comprises a Media Access Control (MAC) address of the Wi-Fi hotspot device, and the processor device is configured to:
   look up information of a device manufacturer corresponding to the MAC address in an Organizationally Unique Identifier (OUI) distribution library; and
   determine whether the Wi-Fi hotspot device is the wireless routing type of device or the intelligent terminal type of device based on the information of the device manufacturer.

7. The apparatus of claim 6, wherein:
when the information of the device manufacturer includes multiple types of Wi-Fi hotspot devices, the processor device determines whether the Wi-Fi hotspot device is the wireless routing type of device or the intelligent terminal type of device based on relationships between MAC addresses provided by the device manufacturer and the multiple types of the Wi-Fi hotspot devices.

8. The apparatus of claim 6, wherein:
when the information of the device manufacturer corresponding to the MAC address is not found in the OUI distribution library, the processor device determines whether the Wi-Fi hotspot device is the wireless routing type of device or the intelligent terminal type of device based on a Service Set Identifier (SSID) of the Wi-Fi hotspot device.

9. A method, implemented by a processor device, for controlling wireless network access, the method comprising:
obtaining a recognition identifier of a Wi-Fi hotspot device through which a client application accesses a wireless network;
determining, by the processor device, whether the Wi-Fi hotspot device is a wireless routing type of device or an intelligent terminal type of device based on the recognition identifier; and
controlling information downloading of the client application according to the determined type of device, including:
  forbidding the client application from downloading a file having a size exceeding a preset value when it is determined that the Wi-Fi hotspot device is the intelligent terminal type of device, and
  allowing the client application to download the file when it is determined that the Wi-Fi hotspot device is the wireless routing type of device.

10. The method of claim 9, wherein the recognition identifier comprises a Media Access Control (MAC) address of the Wi-Fi hotspot device, and determining whether the Wi-Fi hotspot device is the wireless routing type of device or the intelligent terminal type of device based on the recognition identifier comprises:
looking up information of a device manufacturer corresponding to the MAC address in an Organizationally Unique Identifier (OUI) distribution library; and
determining whether the Wi-Fi hotspot device is the wireless routing type of device or the intelligent terminal type of device based on the information of the device manufacturer.

11. The method of claim 10, wherein determining whether the Wi-Fi hotspot device is the wireless routing type of device or the intelligent terminal type of device based on the information of the device manufacturer comprises:
when the information of the device manufacturer includes multiple types of Wi-Fi hotspot devices, determining whether the Wi-Fi hotspot device is the wireless routing type of device or the intelligent terminal type of device based on relationships between MAC addresses provided by the device manufacturer and the multiple types of the Wi-Fi hotspot devices.

12. The method of claim 10, further comprising:
when the information of the device manufacturer corresponding to the MAC address is not found in the OUI distribution library, determining whether the Wi-Fi hotspot device is the wireless routing type of device or the intelligent terminal type of device based on a Service Set Identifier (SSID) of the Wi-Fi hotspot device.

13. A computer server for providing wireless traffic control service to a client application, the computer server comprising:
a memory device; and
a processor device communicatively coupled to the memory device, wherein the processor device is configured to:
  obtain a recognition identifier of a Wi-Fi hotspot device through which the client application accesses a wireless network;
  determine whether the Wi-Fi hotspot device is a wireless routing type of device or an intelligent terminal type of device based on the recognition identifier; and
  control information downloading of the client application according to the determined type of device, including:
    a forbidding of the client application from downloading a file having a size exceeding a preset value when it is determined that the Wi-Fi hotspot device is the intelligent terminal type of device, and
    an allowance of the client application to download the file when it is determined that the Wi-Fi hotspot device is the wireless routing type of device.

14. The computer server of claim 13, wherein the recognition identifier comprises a Media Access Control (MAC) address of the Wi-Fi hotspot device, and the processor device is configured to:
look up information of a device manufacturer corresponding to the MAC address in an Organizationally Unique Identifier (OUI) distribution library; and
determine whether the Wi-Fi hotspot device is the wireless routing type of device or the intelligent terminal type of device based on the information of the device manufacturer.

15. The computer server of claim 14, wherein:
when the information of the device manufacturer includes multiple types of Wi-Fi hotspot devices, the processor device determines whether the Wi-Fi hotspot device is the wireless routing type of device or the intelligent terminal type of device based on relationships between MAC addresses provided by the device manufacturer and the multiple types of the Wi-Fi hotspot devices.

16. The computer server of claim 14, wherein:
when the information of the device manufacturer corresponding to the MAC address is not found in the OUI distribution library, the processor device determines whether the Wi-Fi hotspot device is the wireless routing type of device or the intelligent terminal type of device based on a Service Set Identifier (SSID) of the Wi-Fi hotspot device.

17. A non-transitory computer-readable storage medium that stores a set of instructions that is executable by at least one processor of a device to cause the device to perform a method for controlling wireless data traffic of an information processing device, the method comprising:
obtaining a recognition identifier of a Wi-Fi hotspot device;
determining, by the processor device, whether the Wi-Fi hotspot device is a wireless routing type of device or an intelligent terminal type of device based on the recognition identifier; and
controlling the wireless data traffic of the information processing device according to the determined type of device, including:

forbidding the information processing device from downloading a file having a size exceeding a preset value when it is determined that the Wi-Fi hotspot device is the intelligent terminal type of device, and providing the wireless data traffic of the information processing device when it is determined that the Wi-Fi hotspot device is the wireless routing type of device.

18. The non-transitory computer-readable storage medium of claim 17, wherein the recognition identifier comprises a Media Access Control (MAC) address of the Wi-Fi hotspot device, and determining whether the Wi-Fi hotspot device is the wireless routing type of device or the intelligent terminal type of device based on the recognition identifier comprises:
looking up information of a device manufacturer corresponding to the MAC address in an Organizationally Unique Identifier (OUI) distribution library; and
determining whether the Wi-Fi hotspot device is the wireless routing type of device or the intelligent terminal type of device based on the information of the device manufacturer.

19. The non-transitory computer-readable storage medium of claim 18, wherein determining whether the Wi-Fi hotspot device is the wireless routing type of device or the intelligent terminal type of device based on the information of the device manufacturer comprises:
when the information of the device manufacturer includes multiple types of Wi-Fi hotspot devices, determining whether the Wi-Fi hotspot device is the wireless routing type of device or the intelligent terminal type of device based on relationships between MAC addresses provided by the device manufacturer and the multiple types of the Wi-Fi hotspot devices.

20. The non-transitory computer-readable storage medium of claim 18, wherein the set of instructions that is executable by the at least one processor of the device to cause the device to further perform:
when the information of the device manufacturer corresponding to the MAC address is not found in the OUI distribution library, determining whether the Wi-Fi hotspot device is the wireless routing type of device or the intelligent terminal type of device based on a Service Set Identifier (SSID) of the Wi-Fi hotspot device.

21. A non-transitory computer-readable storage medium that stores a set of instructions that is executable by at least one processor of a device to cause the device to perform a method for controlling wireless network access, the method comprising:
obtaining a recognition identifier of a Wi-Fi hotspot device through which a client application accesses a wireless network;
determining, by the processor device, whether the Wi-Fi hotspot device is a wireless routing type of device or an intelligent terminal type of device based on the recognition identifier; and
controlling information downloading of the client application according to the determined type of device, including:
forbidding the client application from downloading a file having a size exceeding a preset value when it is determined that the Wi-Fi hotspot device is the intelligent tell final type of device, and
allowing the client application to download the file when it is determined that the Wi-Fi hotspot device is the wireless routing type of device.

22. The non-transitory computer-readable storage medium of claim 21, wherein the recognition identifier comprises a Media Access Control (MAC) address of the Wi-Fi hotspot device and determining whether the Wi-Fi hotspot device is the wireless routing type of device or the intelligent terminal type of device based on the recognition identifier comprises:
looking up information of a device manufacturer corresponding to the MAC address in an Organizationally Unique Identifier (OUI) distribution library; and
determining whether the Wi-Fi hotspot device is the wireless routing type of device or the intelligent terminal type of device based on the information of the device manufacturer.

23. The non-transitory computer-readable storage medium of claim 22, wherein determining whether the Wi-Fi hotspot device is the wireless routing type of device or the intelligent terminal type of device based on the information of the device manufacturer comprises:
when the information of the device manufacturer includes multiple types of Wi-Fi hotspot devices, determining whether the Wi-Fi hotspot device is the wireless routing type of device or the intelligent terminal type of device based on relationships between MAC addresses provided by the device manufacturer and the multiple types of the Wi-Fi hotspot devices.

24. The non-transitory computer-readable storage medium of claim 22, wherein the set of instructions that is executable by the at least one processor of the device to cause the device to further perform:
when the information of the device manufacturer corresponding to the MAC address is not found in the OUI distribution library, determining whether the Wi-Fi hotspot device is the wireless routing type of device or the intelligent terminal type of device based on a Service Set Identifier (SSID) of the Wi-Fi hotspot device.

* * * * *

UNITED STATES PATENT AND TRADEMARK OFFICE
CERTIFICATE OF CORRECTION

PATENT NO. : 10,498,731 B2
APPLICATION NO. : 14/746548
DATED : December 3, 2019
INVENTOR(S) : Chao Xiu It is certified that error appears in the above-identified patent and that said Letters Patent is hereby corrected as shown below:

On the Title Page

Item (30), under "Foreign Application Priority Data," "2014 1 0318741" should read --201410318741.4--.

In the Claims

Claim 21. Column 12, Line 11, "intelligent tell final type of device, and" should read --intelligent terminal type of device, and--.

Signed and Sealed this
Fifth Day of July, 2022

Katherine Kelly Vidal
*Director of the United States Patent and Trademark Office*